(12) United States Patent  
Chang et al.

(10) Patent No.: US 12,483,646 B2
(45) Date of Patent: Nov. 25, 2025

(54) ELECTRONIC DEVICE

(71) Applicant: InnoLux Corporation, Miao-Li County (TW)

(72) Inventors: Kuei-Sheng Chang, Miao-Li County (TW); Kuo-Jung Wu, Miao-Li County (TW); Po-Yang Chen, Miao-Li County (TW); I-An Yao, Miao-Li County (TW); Chuan-Chi Chien, Miao-Li County (TW); Shu-Fen Li, Miao-Li County (TW); Hsiao-Feng Liao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 735 days.

(21) Appl. No.: 17/840,536

(22) Filed: Jun. 14, 2022

(65) Prior Publication Data

US 2023/0015777 A1 Jan. 19, 2023

(30) Foreign Application Priority Data

Jul. 14, 2021 (CN) .......................... 202110796921.3

(51) Int. Cl.
*H04M 1/22* (2006.01)
*G06F 3/041* (2006.01)
*G06V 40/13* (2022.01)

(52) U.S. Cl.
CPC ............ *H04M 1/22* (2013.01); *G06F 3/0412* (2013.01); *G06V 40/1318* (2022.01); *H04M 2250/22* (2013.01)

(58) Field of Classification Search
CPC .... H04M 1/22; H04M 2250/22; H04M 1/026; H04M 1/0266; G06F 3/0412; G06V 40/1318
See application file for complete search history.

(56) References Cited

U.S. PATENT DOCUMENTS 7,009,663 B2 3/2006 Abileah
2018/0231853 A1* 8/2018 Yamamoto .......... G02F 1/13338
2020/0342194 A1* 10/2020 Bhat .................. G06V 40/1306

FOREIGN PATENT DOCUMENTS

CN 109358706 A 2/2019

* cited by examiner

*Primary Examiner* — Ayodeji O Ayotunde
(74) *Attorney, Agent, or Firm* — Winston Hsu

(57) ABSTRACT

An electronic device includes a panel having a working area and a peripheral area, signal lines, sub-pixels, bio-sensor units, a first switch unit and a second switch unit. The signal lines are disposed on the panel and have a first signal line and a second signal line. The sub-pixels and the bio-sensor units are disposed in the working area. The sub-pixels have a first sub-pixel and a second sub-pixel. The bio-sensor units have a first bio-sensor unit which is electrically connected to the first signal line. The first switch unit and the second switch unit are disposed in the peripheral area and respectively electrically connected to the first sub-pixel and the second sub-pixel through the first signal line and the second signal line. A first time period that the first switch unit is turned on is longer than a second time period that the second switch unit is turned on.

20 Claims, 8 Drawing Sheets

ELECTRONIC DEVICE

BACKGROUND OF THE DISCLOSURE

1. Field of the Disclosure

The present disclosure relates to an electronic device, and more particularly to an electronic device including a panel and a bio-sensor unit.

2. Description of the Prior Art

In recent years, the technology of integrating panels and bio-sensor units into electronic products has developed vigorously. For example, fingerprint identification can be applied to displays such as smart phones or tablets. However, when the fingerprint identification element is located in the display panel, the fingerprint identification element and the wire may affect the aperture ratio of the pixels, especially affecting severely for the high-resolution displays.

SUMMARY OF THE DISCLOSURE

One of objectives of the present disclosure is to provide an electronic device in which some elements may share signal lines, so that the number of metal traces, the number of layers and/or the number of holes required for layer transfer may be reduced, or the proportion of the area of opaque portions may be reduced, thereby achieving the purpose of taking into account the function of fingerprint identification and a high aperture ratio.

An embodiment of the present disclosure provides an electronic device including a panel, a plurality of signal lines, a plurality of sub-pixels, a plurality of bio-sensor units, a first switch unit and a second switch unit. The panel has a working area and a peripheral area. The plurality of signal lines are disposed on the panel and have a first signal line and a second signal line. The plurality of sub-pixels are disposed in the working area and have a first sub-pixel and a second sub-pixel. The plurality of bio-sensor units are disposed in the working area and have a first bio-sensor unit. The first switch unit is disposed in the peripheral area and electrically connected to the first sub-pixel through the first signal line. The second switch unit is disposed in the peripheral area and electrically connected to the second sub-pixel through the second signal line. The first bio-sensor unit is electrically connected to the first signal line, and a first time period that the first switch unit is turned on is longer than a second time period that the second switch unit is turned on.

An embodiment of the present disclosure further provides an electronic device including a panel, a plurality of signal lines, a plurality of touch units and a plurality of bio-sensor units. The panel has a working area and a peripheral area. The plurality of signal lines are disposed on the panel and have a touch signal line. The plurality of touch units are disposed in the working area and have a first touch unit. The plurality of bio- sensor units are disposed in the working area and have a first bio-sensor unit. The first touch unit is electrically connected to the touch signal line, and the first bio-sensor unit is electrically connected to the touch signal line.

These and other objectives of the present disclosure will no doubt become obvious to those of ordinary skill in the art after reading the following detailed description of the embodiment that is illustrated in the various figures and drawings.

DETAILED DESCRIPTION

Figure 1:
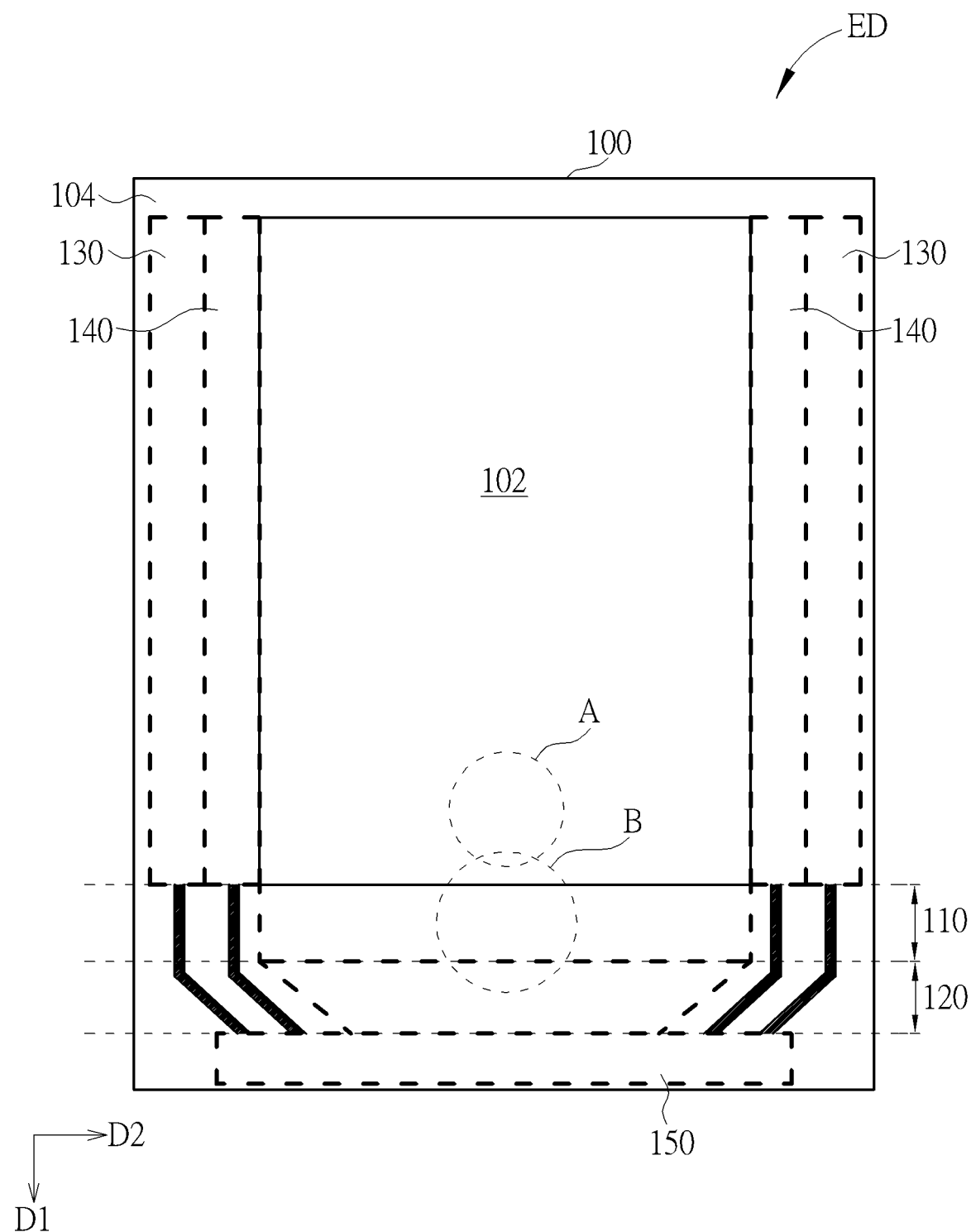
FIG. 1 is a top-view schematic diagram of an electronic device according to an embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device or structure, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". When the terms "include", "comprise" and/or "have" are used in the description of the present disclosure, the corresponding features, areas, steps, operations and/or components would be pointed to existence, but not limited to the existence or addition of one or a plurality of the corresponding or other features, areas, steps, operations, components and/or combinations thereof.

The ordinal numbers used in the description and claims, such as "first", "second", "third", etc., are used to describe elements in the claims, but they do not mean and represent that the element(s) have any previous ordinal numbers, nor do they represent the order of one claimed element and another claimed element, or the order of manufacturing methods. The ordinal numbers are used only to clearly discriminate a claimed element with a certain name from another claimed element with the same name. Accordingly, in the following description, a first element may be a second element in a claim.

The directional terms mentioned in this document, such as "up", "down", "left", "right", "front", "back", etc., are only directions referring to the drawings. Therefore, the directional terms used are for illustration, not for limitation of the present disclosure. It should be understood that the elements specifically described or illustrated can exist in various forms known to one skilled in the art. In addition, when a component or layer is referred to as being "on" or "connected to" another component or layer, it may be directly on or directly connected to the other component or layer, or intervening components or layers may be presented (indirect condition). In contrast, when a component or layer is referred to as being "directly on" or "directly connected to" another component or layer, there are no intervening components or layers presented.

The terms "about", "substantially" and "approximately" mentioned in this document generally mean being within 10% of a given value or range, or being within 5%, 3%, 2%, 1% or 0.5% of a given value or range. The given quantity herein is an approximate quantity, that is, even in an absence of a specific description of "about", "substantially" or "approximately", it may still imply the meaning of "about", "substantially" or "approximately".

The electronic device may achieve the display function through the structure of the embodiment of the present disclosure. The electronic device may include a display device, a sensing device, a tiled device or a transparent display device, but not limited herein. The electronic device may be a rollable, stretchable, bendable or flexible electronic device. The electronic device may include, for example, liquid crystals, light emitting diodes (LEDs), quantum dots (QDs), fluorescence, phosphors or other suitable materials. The light emitting diodes may include, for example, organic light emitting diodes (OLEDs), mini light emitting diodes (mini LEDs), micro light emitting diodes (micro LEDs) or quantum dot light emitting diodes (e.g. QDLEDs or QLEDs), but not limited herein. The tiled device may be, for example, a tiled display device, but not limited herein. It should be noted that, the electronic device may be any arrangement and combination of the devices described above, but not limited herein. In addition, the appearance of the electronic device may be rectangular, circular, polygonal, a shape with curved edges or other suitable shapes. The electronic device may have external systems such as a driving system, a control system, a light source system, a shelf system, etc. to support a display device or a tiled device, but not limited herein.

It should be noted that the technical features in different embodiments described in the following can be replaced, recombined, or mixed with one another to constitute another embodiment without departing from the spirit of the present disclosure.

Figure 2:
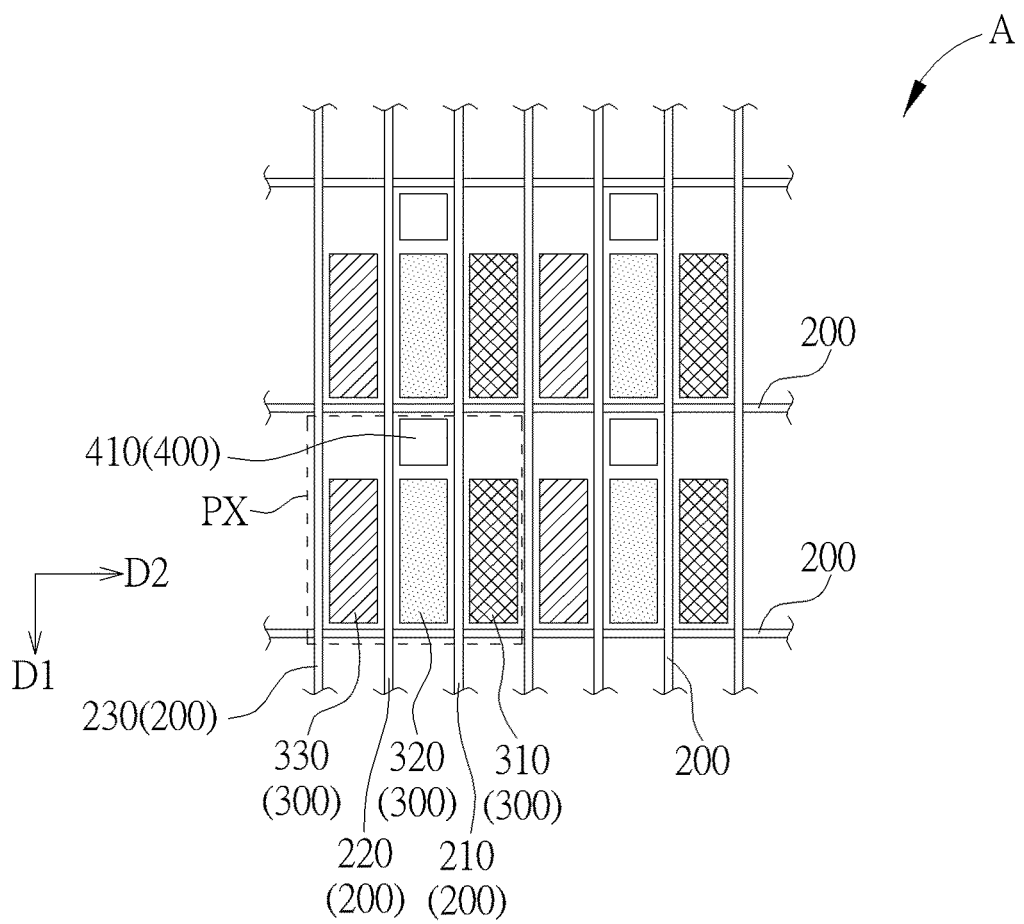
FIG. 2 is a partially enlarged top-view schematic diagram of a region A in FIG. 1.
Figure 3:
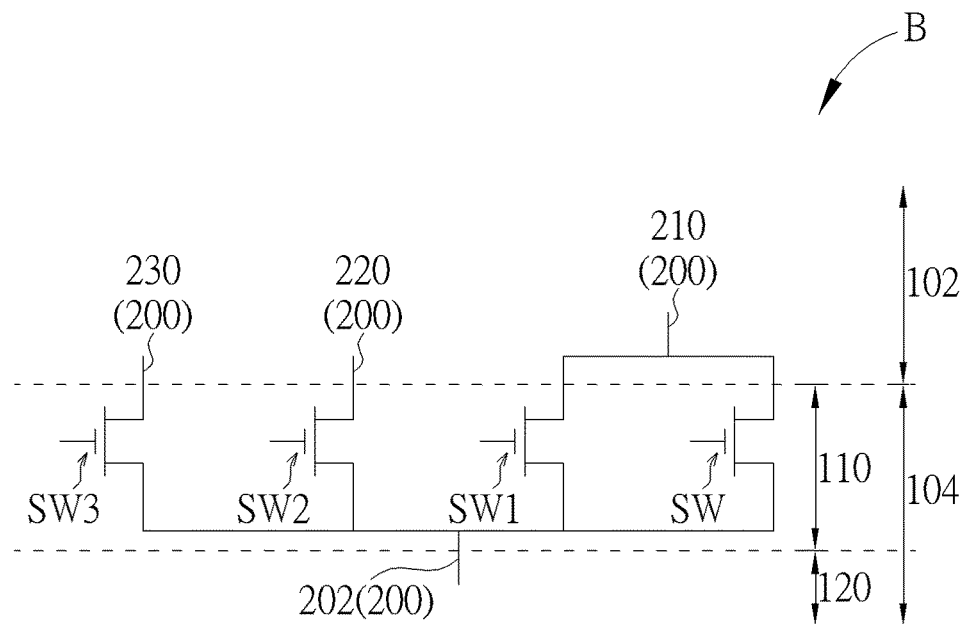
FIG. 3 is a partially enlarged circuit architecture schematic diagram of a region B in FIG. 1.
Figure 4:
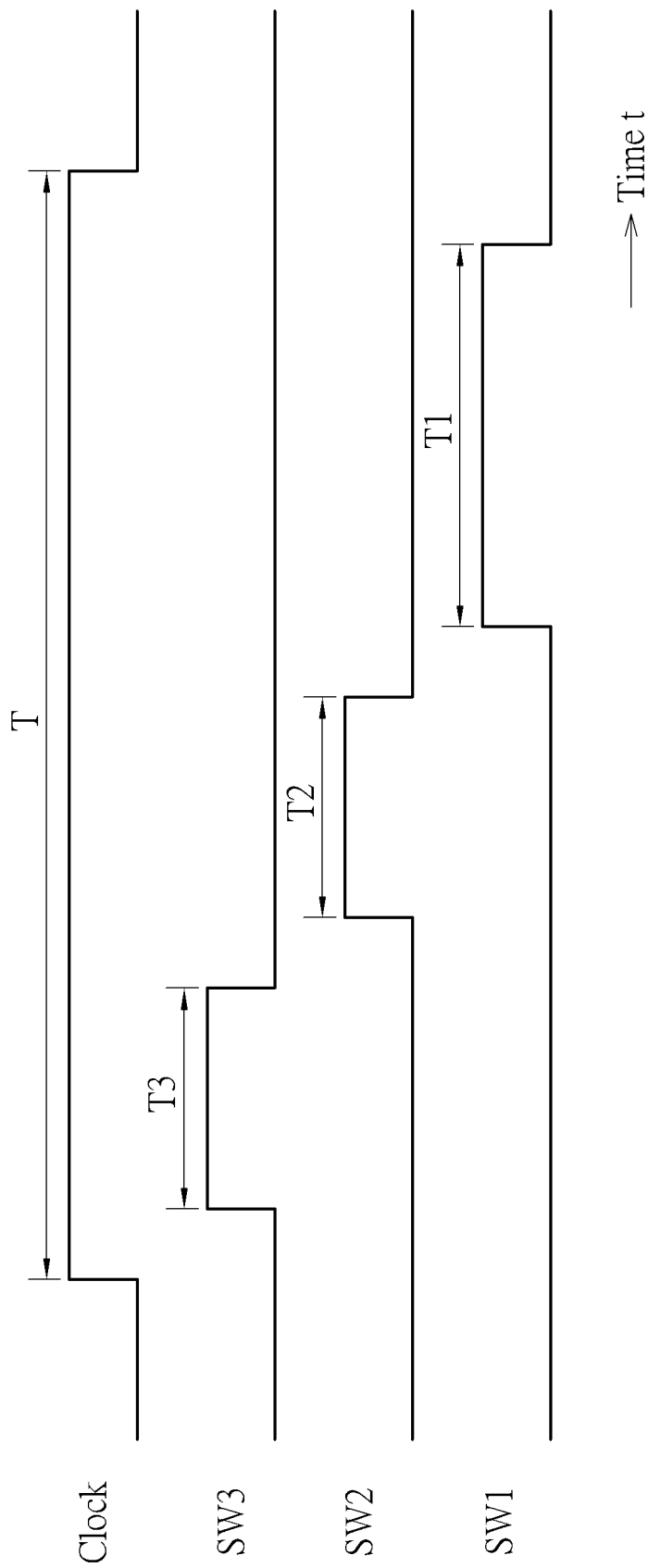
FIG. 4 is a schematic diagram of signal cycles of switch units according to an embodiment of the present disclosure.

Please refer to FIG. 1, FIG. 2, FIG. 3 and FIG. 4. FIG. 1 is a top-view schematic diagram of an electronic device according to an embodiment of the present disclosure. FIG. 2 is a partially enlarged top-view schematic diagram of a region A in FIG. 1. FIG. 3 is a partially enlarged circuit architecture schematic diagram of a region B in FIG. 1. FIG. 4 is a schematic diagram of signal cycles of switch units according to an embodiment of the present disclosure, wherein the horizontal axis indicates time t. As shown in FIG. 1, FIG. 2 and FIG. 3, an electronic device ED of an embodiment of the present disclosure may include a panel 100, a plurality of signal lines 200, a plurality of sub-pixels 300, a plurality of bio-sensor units 400, a first switch unit SW1, a second switch unit SW2, a third switch unit SW3, and a sensing switch unit SW. The panel 100 has a working area 102 and a peripheral area 104. The peripheral area 104 is adjacent to the working area 102. For example, the peripheral area 104 may be located around the working area 102, but not limited herein. As shown in FIG. 1, the electronic device ED may further include a data demultiplexer region 110, a fan-out region 120, a display gate driving unit 130, a sensing gate driving unit 140 and/or a bonding region 150 within the peripheral area 104, but not limited herein. As shown in FIG. 1, the data demultiplexer region 110, the fan-out region 120 and the bonding region 150 are substantially disposed in the peripheral area 104 on one side (e.g., the lower side) of the working area 102 along a first direction D1 in sequence, and the display gate driving unit 130 and the sensing gate driving unit 140 are disposed in the peripheral area 104 on at least another side (e.g., the left side or the right side) of the working area 102 to correspondingly drive the plurality of sub-pixels 300 or bio-sensor units 400 shown in FIG. 2. However, the function of each region in the peripheral area 104 is not limited herein.

The plurality of signal lines 200 are disposed on the panel 100, and the plurality of signal lines 200 may have a first signal line 210, a second signal line 220 and a third signal line 230. In the embodiment shown in FIG. 2, the first signal line 210, the second signal line 220 and the third signal line 230 may extend along the first direction D1. The plurality of signal lines 200 may include, for example, data lines, scan lines, signal readout lines and/or touch signal lines.

The plurality of sub-pixels 300 may be disposed in the working area 102, and the plurality of sub-pixels 300 may have a first sub-pixel 310 and a second sub-pixel 320. One sub-pixel 300 may be, for example, a region defined by two adjacent signal lines 200 extending along the first direction D1 (e.g., two data lines) and two adjacent signal lines 200 extending along a second direction D2 (e.g., two scan lines), as shown in FIG. 2. A number of sub-pixels 300 may form a pixel PX, and a plurality of pixels PX may be arranged in an array and disposed in the working area 102 to provide displaying images. In some embodiments, the first sub-pixel 310 may be one of a blue sub-pixel, a red sub-pixel and a green sub-pixel, and the second sub-pixel 320 may be another one of the blue sub-pixel, the red sub-pixel and the green sub-pixel. In some embodiments, each pixel PX may include a first sub-pixel 310, a second sub-pixel 320 and a third sub-pixel 330, the first sub-pixel 310 may be a blue sub-pixel, the second sub-pixel 320 may be a green sub-pixel, and the third sub-pixel 330 may be a red sub-pixel. However, the colors that the first sub-pixel 310, the second sub-pixel 320 and the third sub-pixel 330 corresponding to are not limited to the above and may be exchanged in different embodiments, so as to make the formed pixel PX include a blue sub-pixel, a red sub-pixel and a green sub-pixel. In some embodiments, the pixel PX may further include other colors and/or more number of sub-pixels, which is not limited to the design of pixel described above.

The plurality of bio-sensor units 400 may be disposed in the working area 102, and the plurality of bio-sensor units 400 may have a first bio-sensor unit 410. The plurality of bio-sensor units 400 may include, for example, fingerprint sensors, but not limited herein. In some embodiments, the bio-sensor units 400 may be disposed corresponding to the pixels PX. For example, one bio-sensor unit 400 may be disposed corresponding to one pixel PX (as shown in FIG. 2), but not limited herein. According to practical requirements, it may also be designed that plural bio-sensor units 400 are disposed corresponding to one pixel PX, or one bio-sensor unit 400 is disposed corresponding to plural pixels PX.

The first switch unit SW1 may be disposed in the peripheral area 104 and electrically connected to the first sub-pixel 310 through the first signal line 210. The second switch unit SW2 may be disposed in the peripheral area 104 and electrically connected to the second sub-pixel 320 through the second signal line 220. Furthermore, the first bio-sensor unit 410 may be electrically connected to the first signal line 210, that is, the first sub-pixel 310 and the first bio-sensor unit 410 are both electrically connected to the first signal line 210 and may share the first signal line 210. The resistance-capacitance (RC) loading of the first signal line 210 is greater than the resistance-capacitance loading of the second signal line 220 since the first sub-pixel 310 shares the first signal line 210 with the first bio-sensor unit 410, so a first time period T1 that the first switch unit SW1 electrically connected to the first signal line 210 is turned on may be longer than a second time period T2 that the second switch unit SW2 is turned on, which makes the first sub-pixel 310 have a longer charging time, as shown in FIG. 4. In some embodiments, as shown in FIG. 1 to FIG. 3, the sensing switch unit SW may be disposed in the peripheral area 104 and electrically connected to the first bio-sensor unit 410 through the first signal line 210, and the third switch unit SW3 may be disposed in the peripheral area 104 and electrically connected to the third sub-pixel 330 through the third signal line 230. The first signal line 210 may be a data line of the first sub-pixel 310, the second signal line 220 may be a data line of the second sub-pixel 320, the third signal line 230 may be a data line of the third sub-pixel 330, and the first signal line 210 may further be a signal readout line of the first bio-sensor unit 410. That is to say, the first signal line 210 is shared as the data line electrically connected to the first sub-pixel 310 and the signal readout line electrically connected to the first bio-sensor unit 410, and the term "shared" is referred to that the first sub-pixel 310 and the first bio-sensor unit 410 may use the same first signal line 210 to receive or output signals at different times. By sharing the first signal line 210, the number of traces and the number of holes required for layer transfer in the working area 102 may be reduced, or the aperture ratio may be increased, so that high-resolution display and function of fingerprint identification may both be achieved. In addition, the shared signal line may be further divided into a plurality of signal lines in the peripheral area 104 or at the place close to the peripheral area 104 according to the designs.

As shown in FIG. 4, the time that the first switch unit SW1 is turned on is the first time period T1, the time that the second switch unit SW2 is turned on is the second time period T2, and the time that the third switch unit SW3 is turned on is a third time period T3. Furthermore, the corresponding scan line (e.g., the signal line 200 extending along the second direction D2, wherein the second direction D2 may be different from the first direction D1, such as approximately perpendicular to the first direction D1) also reaches a voltage within a time period T (i.e., a gate signal cycle line labeled as "Clock" in FIG. 4) to make the gates of the sub-pixels 300 (e.g., the first sub-pixel 310, the second sub-pixel 320 and the third sub-pixel 330) be in a state of on, so that the sub-pixels 300 may receive display data from the signal lines 200 (e.g., the first signal line 210, the second signal line 220 and the third signal line 230) to display images. The first sub-pixel 310 and the first bio-sensor unit 410 are both electrically connected to the first signal line 210, so it is designed that the first time period T1 that the first switch unit SW1 electrically connected to the first signal line 210 is turned on is longer than the second time period T2 that the second switch unit SW2 is turned on and/or longer than the second time period T3 that the third switch unit SW3 is turned on.

In some embodiments, as shown in FIG. 1 and FIG. 3, the first switch unit SW1, the second switch unit SW2, the third switch unit SW3 and the sensing switch unit SW may be disposed in the data demultiplexer region 110 and all electrically connected to a source line 202 of the plurality of signal lines 200. The source line 202 may extend through the fan-out region 120 and into the bonding region 150 shown in FIG. 1 to be electrically connected to a bonding pad (not shown) disposed in the bonding region 150. The bonding pad may further be electrically connected to a chip (not shown) disposed on the bonding region 150. Furthermore, the display gate driving unit 130 and the sensing gate driving unit 140 may be respectively electrically connected to bonding pads (not shown) in the bonding region 150.

Figure 5:
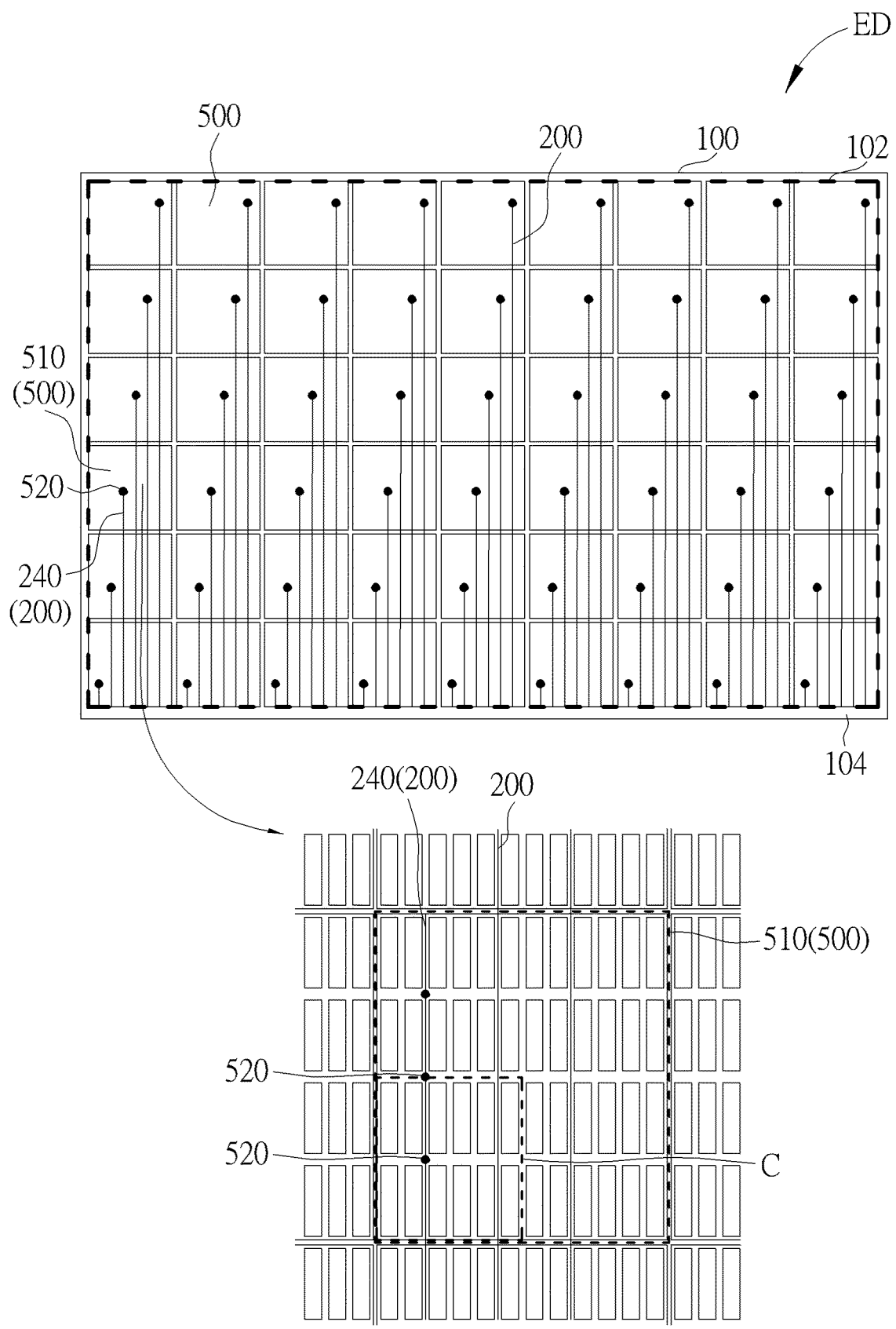
FIG. 5 is a top-view schematic diagram and a partially enlarged top-view schematic diagram of an electronic device according to an embodiment of the present disclosure.
Figure 6:
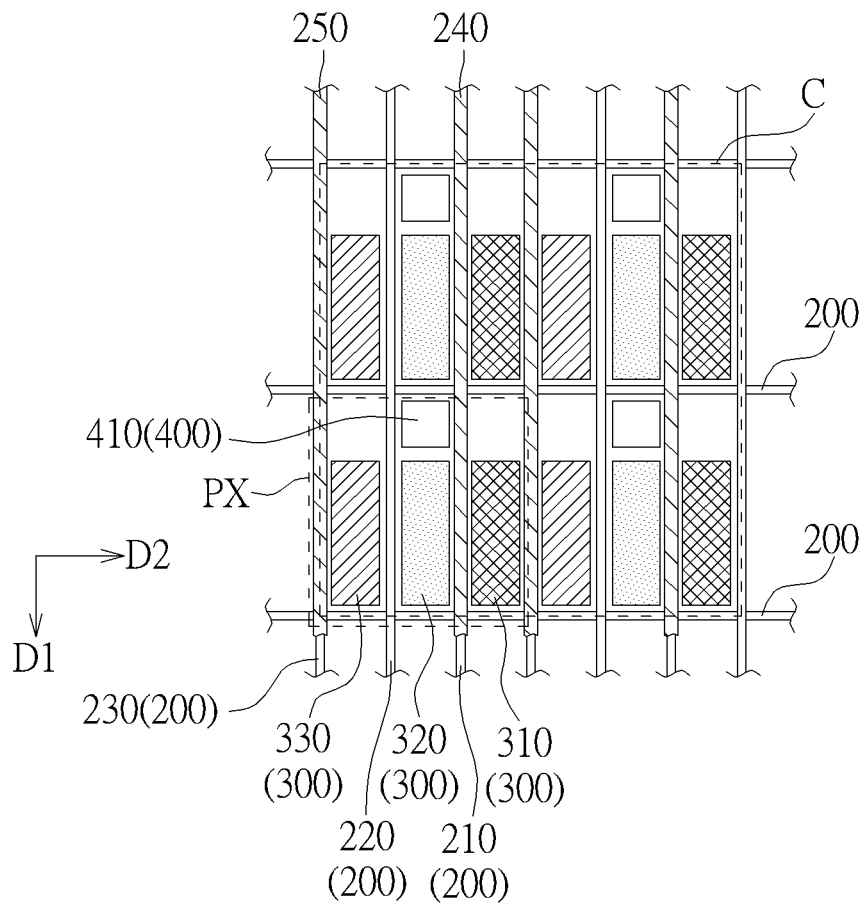
FIG. 6 is a top-view schematic diagram of signal lines, sub-pixels and bio-sensor units in a partial region of an electronic device according to an embodiment of the present disclosure.
Figure 7:
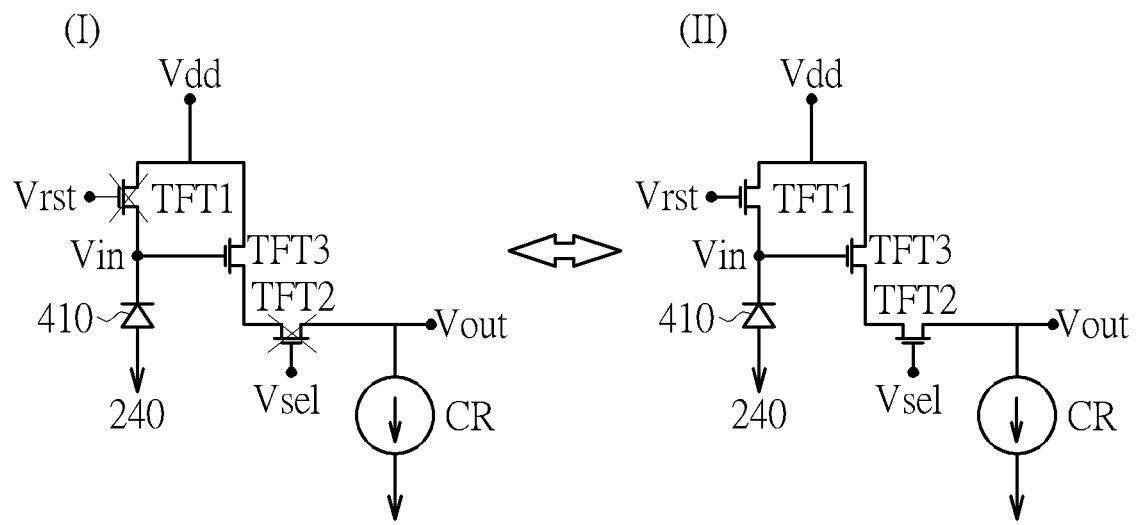
FIG. 7 is a circuit architecture schematic diagram of a bio-sensor unit shown in FIG. 5.

Please refer to FIG. 5, FIG. 6 and FIG. 7. FIG. 5 is a top-view schematic diagram of an electronic device according to an embodiment of the present disclosure, and the lower side of FIG. 5 further shows a partially enlarged schematic diagram of touch units and sub-pixels. FIG. 6 is a top-view schematic diagram of signal lines, sub-pixels and bio-sensor units in a partial region of an electronic device according to an embodiment of the present disclosure, and FIG. 6 is a partially enlarged top-view schematic diagram of a region C in FIG. 5. FIG. 7 is a circuit architecture schematic diagram of a bio-sensor unit shown in FIG. 5. As shown in FIG. 5, FIG. 6 and FIG. 7, an electronic device ED of an embodiment of the present disclosure may include a panel 100, a plurality of signal lines 200, a plurality of touch units 500 and a plurality of bio-sensor units 400. The panel 100 has a working area 102 and a peripheral area 104. The peripheral area 104 is adjacent to the working area 102. For example, the peripheral area 104 may be located around the working area 102, but not limited herein. The circuit design such as the driving circuit, switch circuit and/or fan-out structure may be disposed in the peripheral area 104, but not limited herein. The plurality of signal lines 200 are disposed on the panel 100, and the plurality of signal lines 200 include a touch signal line 240. The plurality of signal lines 200 may further include, for example, data lines, scan lines and/or signal readout lines.

The plurality of touch units 500 are disposed in the working area 102, and a first touch unit 510 of the plurality of touch units 500 may be electrically connected to the touch signal line 240. In some embodiments, the first touch unit 510 may be electrically connected to the touch signal line 240 through one or plural contact hole(s) 520.

The plurality of bio-sensor units 400 are disposed in the working area 102, and the plurality of bio-sensor units 400 have a first bio-sensor unit 410. The plurality of bio-sensor units 400 may include, for example, fingerprint sensors, but not limited herein. Furthermore, the first bio-sensor unit 410 is electrically connected to the touch signal line 240. That is to say, the first touch unit 510 and the first bio-sensor unit 410 are both electrically connected to the touch signal line 240.

In some embodiments, as shown in FIG. 7, The first bio-sensor unit 410 may be electrically connected to the touch signal line 240, a first electrode of a thin film transistor TFT1 and a gate of a thin film transistor TFT3, and the first bio-sensor unit 410 may be electrically connected to a thin film transistor TFT2 through the thin film transistor TFT1 and the thin film transistor TFT3. The thin film transistor TFT1 may be used as a reset element, the thin film transistor TFT2 may be used as a selecting element, the thin film transistor TFT3 may be used as an amplifier element, and the thin film transistor TFT2 may be electrically connected to a current source CR. A second electrode of the thin film transistor TFT1 and a first electrode of the thin film transistor TFT3 may be electrically connected to a working voltage Vdd, a gate of the thin film transistor TFT1 may be electrically connected to a reset voltage Vrst, and the first electrode of the thin film transistor TFT 1 may provide an input voltage Vin to the gate of the thin film transistor TFT3 and the first bio-sensor unit 410. A first electrode of the thin film transistor TFT2 may be electrically connected to a second electrode of the thin film transistor TFT3, a gate of the thin film transistor TFT2 may be electrically connected to a selecting voltage Vsel, and a second electrode of the thin film transistor TFT 2 may output an output voltage Vout. Furthermore, the touch signal line 240 may provide a bias voltage to the first bio-sensor unit 410. It should be noted that, the thin film transistor TFT1, the thin film transistor TFT2 and the thin film transistor TFT3 may be located in a light shielding region (not shown) such as a black matrix, and the current source CR may be located in an external driving chip (not shown), but the present disclosure is not limited herein. In addition, the arrangement of circuits and the use of each element in the present disclosure are only one of the examples, and the circuit design and the relationship of electrical connection between each element may be changed according to practical requirements.

The touch signal line 240 provides a waveform voltage (e.g., a square wave signal) when the electronic device ED is in a touch state I, so as to provide a signal required for touch sensing. At this time, the thin film transistor TFT1 and the thin film transistor TFT2 are turned off, and the thin film transistor TFT3 is turned on. The touch signal line 240 may provide a constant bias voltage when the electronic device ED is in certain stages of a bio-sensing state II (e.g., a reset time period P1 and a scan time period P3 shown in FIG. 9) while not in the touch state I, so as to provide the constant voltage to the first bio-sensor unit 410. At this time, the thin film transistor TFT1, the thin film transistor TFT2 and the thin film transistor TFT3 are all turned on, and the signal sensed by the first bio-sensor unit 410 may be outputted as the output voltage Vout to the signal readout line (not shown) through the TFT2. Through the design described above, the touch signal line 240 may be used as a bias voltage line of the first bio-sensor unit 410. That is to say, the touch signal line electrically connected to the first touch unit 510 and the bias voltage line electrically connected to the first bio-sensor unit 410 share the touch signal line 240, and the term "share" is referred to that the first bio-sensor unit 410 and the first touch unit 510 may receive voltages at different times through the same touch signal line 240. By sharing the same touch signal line 240, the number of traces and the number of holes required for layer transfer in the working area 102 may be reduced, or the aperture ratio may be increased, so that fingerprint identification with high resolution may be achieved. In addition, the shared signal line may be further divided into a plurality of signal lines in the peripheral area 104 or at the place close to the peripheral area 104.

Figure 8:
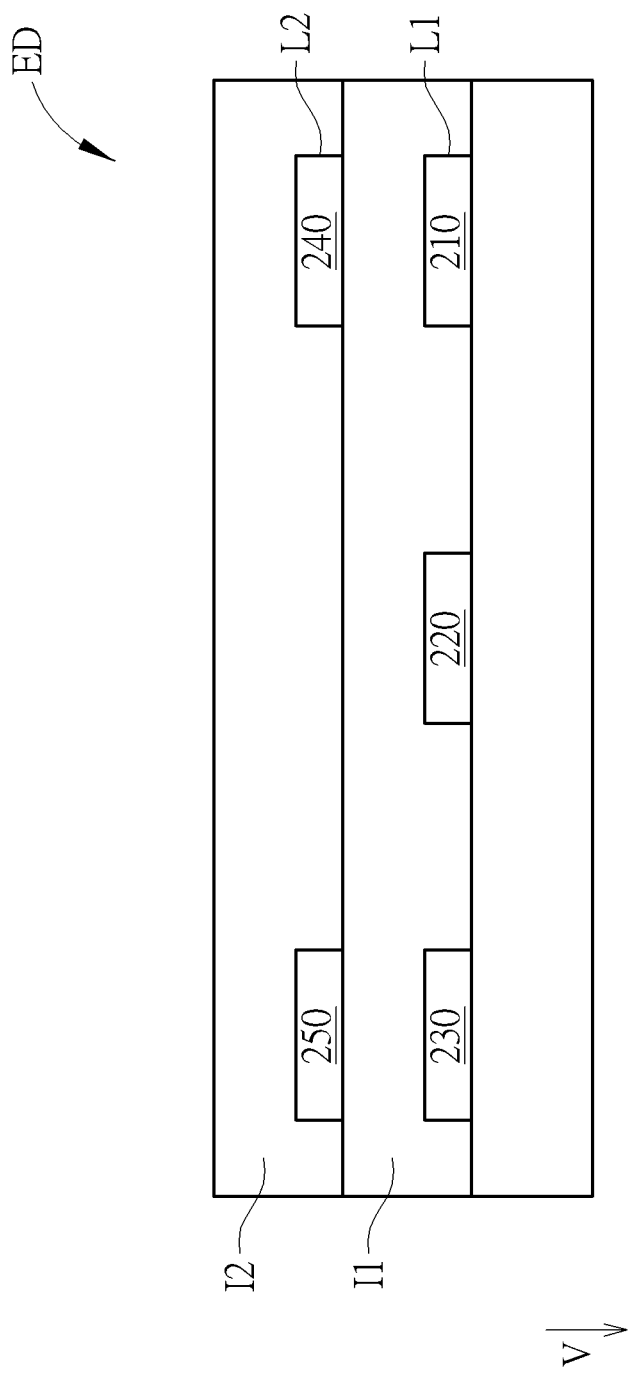
FIG. 8 is a partial cross-sectional view schematic diagram of signal lines of an electronic device according to an embodiment of the present disclosure.

In the electronic device ED of some embodiments, according to the structure of the above embodiments, it may be designed that the data line electrically connected to the first sub-pixel 310 and the signal readout line electrically connected to the first bio-sensor unit 410 share the first signal line 210, or the touch signal line electrically connected to the first touch unit 510 and the bias voltage line electrically connected to the first bio-sensor unit 410 share the touch signal line 240. That is to say, the first signal line 210 may be electrically connected to the first sub-pixel 310 and the first bio-sensor unit 410 at the same time, in order to be used as the data line for transmitting display data to the first sub-pixel 310 and the signal readout line for outputting sensing signals from the first bio-sensor unit 410. The touch signal line 240 may be electrically connected to the first touch unit 510 and the first bio-sensor unit 410 at the same time, so as to serve as the touch signal transmission wire of the first touch unit 510 and the bias voltage line of the first bio-sensor unit 410, and the constituted structure may be referred to FIG. 8. FIG. 8 is a partial cross-sectional view schematic diagram of signal lines of an electronic device according to an embodiment of the present disclosure. The signal lines 200 of the electronic device ED may include a first signal line 210, a second signal line 220, a third signal line 230, a touch signal line 240 and a voltage source signal line 250. The first signal line 210, the second signal line 220 and the third signal line 230 may be formed of the same conductive layer L1, the touch signal line 240 and the voltage source signal line 250 may be formed of the same conductive layer L2, and the conductive layer L2 is disposed on the conductive layer L1. An insulating layer I1 may be disposed between the conductive layer L1 and the conductive layer L2, and another insulating layer I2 may cover the conductive layer L2. As shown in FIG. 8, the touch signal line 240 may be at least partially overlapped with the first signal line 210 in a top-view direction V of the electronic device ED, but the structure and the use of each signal line of the present disclosure are not limited herein. For example, in a variation embodiment, the touch signal line 240 of the present disclosure may be at least partially overlapped with one of the first signal line 210, the second signal line 220 and the third signal line 230 in the top-view direction V of the electronic device ED.

It should be noted that, FIG. 5 to FIG. 8 described above show the electronic device including the touch units according to the present disclosure, and the design for electrical connection of elements and signal lines and the design for layers and structure of this electronic device may further be applied to the embodiments of FIG. 1 to FIG. 4. That is to say, FIG. 1 to FIG. 8 may also be regarded as the same embodiment in some exemplified embodiments of the present disclosure.

Figure 9:
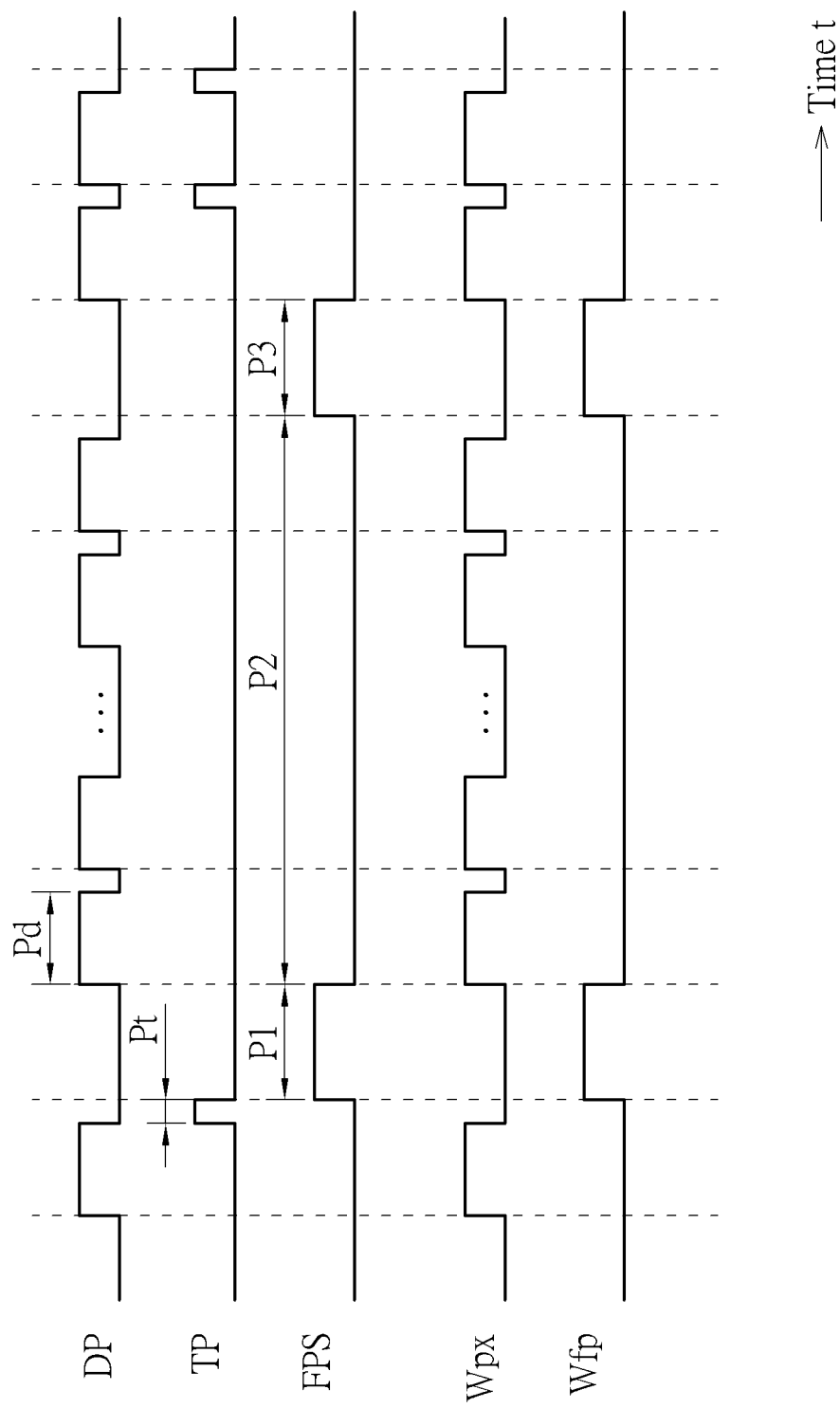
FIG. 9 is a waveform schematic diagram of signals of elements of an electronic device according to an embodiment of the present disclosure.

Please refer to FIG. 9 and FIG. 1 to FIG. 7. FIG. 9 is a waveform schematic diagram of signals of elements of an electronic device according to an embodiment of the present disclosure, wherein the horizontal axis indicates time t, and the vertical axis indicates the time period or the on/off of the signal. In FIG. 9, a waveform DP shows a time period that the electronic device ED displays a frame, which is represented by a display time period Pd. A waveform TP shows a time period that the touch unit 500 (e.g., the first touch unit 510) functions, which is represented by a touch time period Pt, and the waveform TP may further show the time that the touch unit 500 is turned on when the electronic device ED is in the touch state. A waveform FPS shows a time period that the bio-sensor unit 400 (e.g., the first bio-sensor unit 410) functions. A waveform Wpx shows the time that the first switch unit SW1, the second switch unit SW2 and the third switch unit SW3 are turned on. A waveform Wfp shows the time that the sensing switch unit SW is turned on. The rising parts of the waveform Wpx and the waveform Wfp indicate that the corresponding switch units are in the state of on or the state providing signals, and the non-rising parts of the waveform Wpx and the waveform Wfp indicate that the corresponding switch units are in the state of off or the state without providing signals. As shown in FIG. 9 and FIG. 1 to FIG. 7, in some embodiments, the electronic device ED may include a first touch unit 510, a first bio-sensor unit 410, a first switch unit SW1, a second switch unit SW2, a third switch unit SW3, and a sensing switch unit SW. The first switch unit SW1, the second switch unit SW2 and the third switch unit SW3 respectively correspond to the first sub-pixel 310, the second sub-pixel 320 and the third sub-pixel 330 and respectively control the turning on and turning off of these sub-pixels. Therefore, the time that the first switch unit SW1 is turned on and off, the time that the second switch unit SW2 is turned on and off and the time that the third switch unit SW3 is turned on and off respectively correspond to the turning on and turning off of the first sub-pixel 310, the turning on and turning off of the second sub-pixel 320 and the turning on and turning off of the third sub-pixel 330, and the sum of the time of turned on corresponds to the display time period Pd. The sensing switch unit SW is electrically connected to the first bio-sensor unit 410, so the time that the sensing switch unit SW is turned on and off corresponds to the time that the first bio-sensor unit 410 functions, and also corresponds to the waveform FPS. The arrangement, structure and connection relationship of the elements described above are detailed in the previous embodiments, and will not be redundantly described herein.

While in a reset time period P1 of the first bio-sensor unit 410, the first switch unit SW1, the second switch unit SW2 and the third switch unit SW3 are turned off, and the sensing switch unit SW is turned on, so that the first bio-sensor unit 410 is in a reset state, and the input voltage Vin (shown in FIG. 7) at one end of the first bio-sensor unit 410 has an initial voltage. While in a exposure time period P2 of the first bio-sensor unit 410, the sensing switch unit SW is turned off, and the first switch unit SW1, the second switch unit SW2 and the third switch unit SW3 are turned on, so that the first bio-sensor unit 410 is in an exposure state, and the reflected light may have different intensity distributions according to biological surface features (e.g., ridges and valleys of fingerprints) at this time, which makes the input voltage Vin change. While in a scan time period P3 of the first bio-sensor unit 410, the first switch unit SW1, the second switch unit SW2 and the third switch unit SW3 are turned off, and the sensing switch unit SW is turned on, so that the first bio-sensor unit 410 is in a scan state, and the input voltage Vin may be finally outputted as the output voltage Vout to a signal readout line (not shown) through the circuit shown on the right side of FIG. 7.

It should be noted that, although the aforementioned bio-sensing state II of the first bio-sensor unit 410 may include the reset time period P1, the exposure time period P2 and the scan time period P3, and the total time length of the bio-sensing state II may be as long as one or even plural display time period(s) Pd, the thin film transistor TFT1, the thin film transistor TFT2 and the thin film transistor TFT3 in the circuit shown in FIG. 7 are all turned on only in the reset time period P1 and the scan time period P3. Furthermore, the state of on or off of each element in the circuit shown in FIG. 7 in the exposure time period P2 may be the same as that in the touch state I, so that the input voltage Vin changes because the first biosensor unit 410 receives light.

Figure 10:
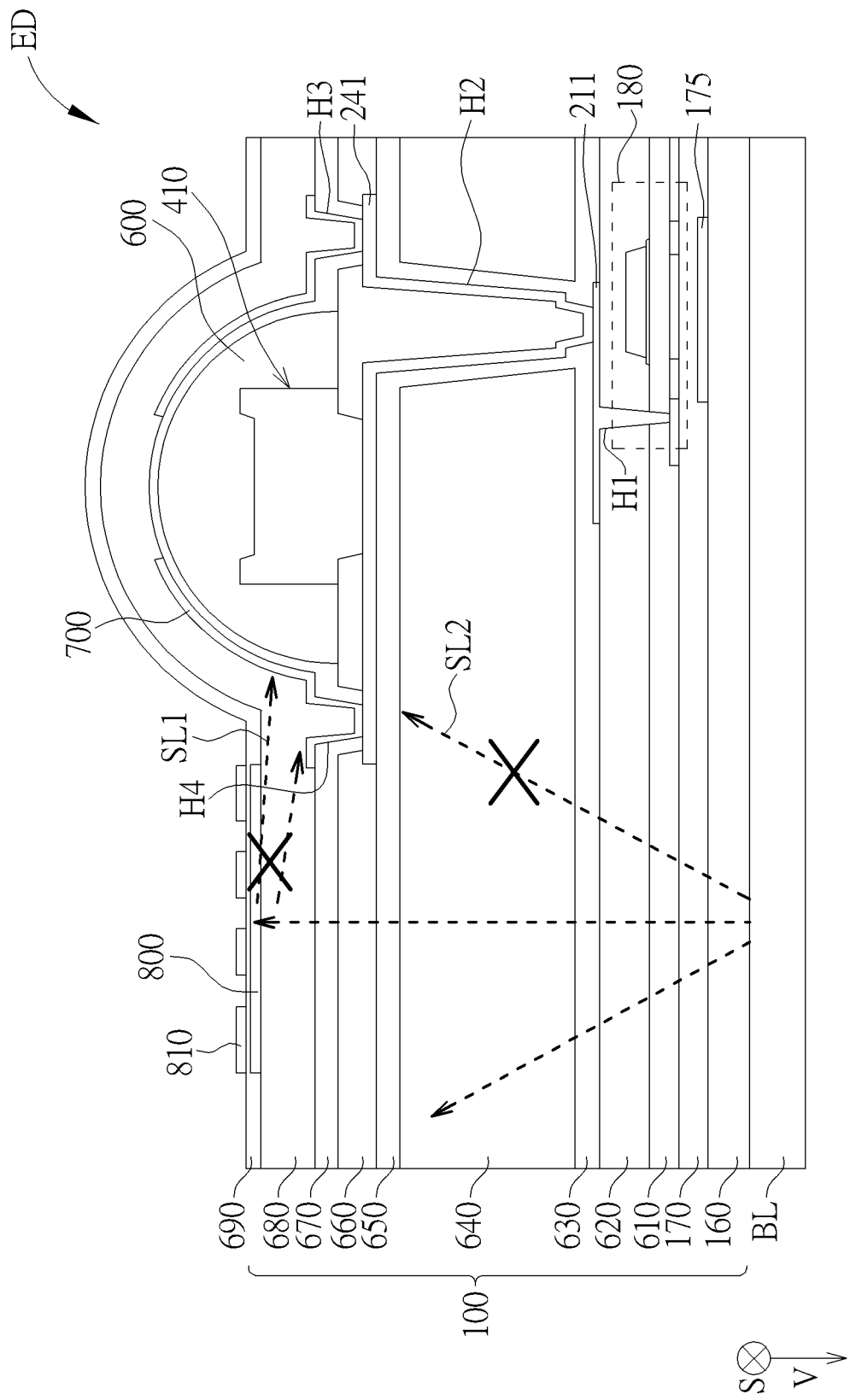
FIG. 10 is a partial cross-sectional view schematic diagram of an electronic device according to an embodiment of the present disclosure.

Please refer FIG. 10. FIG. 10 is a partial cross-sectional view schematic diagram of an electronic device according to an embodiment of the present disclosure. In some embodiments, as shown in FIG. 10, the electronic device ED may further include an insulating layer 600 overlapped with the first bio-sensor unit 410. The insulating layer 600 has an arc-shaped profile in a viewing direction S, and the insulating layer 600 is disposed around the first bio-sensor unit 410 and may surround the first bio-sensor unit 410. Since the insulating layer 600 is disposed only around the first bio-sensor unit 410, the panel 100 has a protruded shape in a corresponding region that the first bio-sensor unit 410 is disposed on. In some embodiments, the electronic device ED may further include a light shielding cover 700 disposed on the insulating layer 600 and partially overlapped with the first bio-sensor unit 410. That is to say, the light shielding cover 700 may be overlapped with a portion of the first bio-sensor unit 410 in the top-view direction V of the electronic device ED, so as to reduce the incidence of stray light SL1 (e.g., light from a backlight source or oblique large-angle ambient light) to the first bio-sensor unit 410, thereby improving the sensing quality of the first bio-sensor unit 410. The light shielding cover 700 may include, for example, metal material, but not limited herein.

For example, as shown in FIG. 10, the electronic device ED may include a backlight unit BL and a panel 100 disposed on the backlight unit BL. The panel 100 may include a substrate 160, a buffer layer 170, a bottom light shielding layer 175, a thin film transistor 180, an insulating layer 610, an insulating layer 620, a connection element 211, an insulating layer 630, an insulating layer 640, an insulating layer 650, a connection electrode 241, an insulating layer 660, a first bio-sensor unit 410, an insulating layer 600, an insulating layer 670, a light shielding cover 700, an insulating layer 680, an insulating layer 690, a conductive layer 800 and a conductive layer 810. The conductive layer 800 and a conductive layer 810 may be transparent conductive layers such as including indium tin oxide (ITO). The substrate 160 may include rigid material and/or flexible material, such as including glass, a quartz substrate, polyimide (PI), polyethylene terephthalate (PET), other suitable materials or any combination of the above, but not limited herein. The thin film transistor 180 may be used, for example, as a switch element or a driving element, but not limited herein. It should be noted that the thin film transistor 180 shown in FIG. 10 corresponds to the thin film transistor TFT1 shown in FIG. 7. The connection element 211 is electrically connected to the thin film transistor 180 through a connection hole H1, and the connection electrode 241 is electrically connected to the connection element 211 through a connection hole H2. The connection element 211 in this embodiment and the first signal line 210 described above may be formed of the same conductive layer, such as the conductive layer L1 shown in FIG. 8. The connection electrode 241 is electrically connected to the first bio-sensor unit 410 and disposed between the first bio-sensor unit 410 and the backlight unit BL, so as to reduce the incidence of stray light SL2 emitted from the backlight unit BL to the first bio-sensor unit 410, thereby improving the sensing quality of the first bio-sensor unit 410. The connection electrode 241 may include, for example, metal material, but not limited herein. The connection electrode 241 in this embodiment and the touch signal line 240 described above may be formed of the same conductive layer, such as the conductive layer L2 shown in FIG. 8. The first bio-sensor unit 410 is, for example, a PIN diode, any other suitable photoelectric conversion element or light sensing element, but the first bio-sensor unit 410 of the present disclosure is not limited herein, and any other suitable bio-sensing element may be applied to the first bio-sensor unit 410 of the present disclosure. The light shielding cover 700 may be electrically connected to the connection electrode 241, as shown in FIG. 10. For example, the light shielding cover 700 may be electrically connected to the connection electrode 241 through a connection hole H3 and a connection hole H4, so that the light shielding cover 700 and the connection electrode 241 have the same potential, thereby reducing the influence of the potential difference of the light shielding cover on display, touch sensing or biological feature sensing, but the electronic device of the present disclosure is not limited herein. In some embodiments, the light shielding cover 700 may not be electrically connected to the connection electrode 241, and the potential of the light shielding cover 700 may be floating. In some embodiments, the light shielding cover 700 may be a portion of a black matrix.

From the above description, according to the electronic device of the embodiments in the present disclosure, through sharing a portion of the signal lines, the number of layers and/or the number of holes required for layer transfer may be reduced, thereby increasing the aperture ratio, so that fingerprint identification with high resolution may be achieved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a panel having a working area and a peripheral area;
a plurality of signal lines disposed on the panel and having a first signal line and a second signal line;
a plurality of sub-pixels disposed in the working area and having a first sub-pixel and a second sub-pixel;
a plurality of bio-sensor units disposed in the working area and having a first bio-sensor unit;
a first switch unit disposed in the peripheral area and electrically connected to the first sub-pixel through the first signal line; and
a second switch unit disposed in the peripheral area and electrically connected to the second sub-pixel through the second signal line,
wherein the first bio-sensor unit is electrically connected to the first signal line, and a first time period that the first switch unit is turned on is longer than a second time period that the second switch unit is turned on.

2. The electronic device according to claim 1, wherein the first signal line is a signal readout line of the first bio-sensor unit.

3. The electronic device according to claim 2, wherein the first signal line is a data line of the first sub-pixel, and the second signal line is a data line of the second sub-pixel.

4. The electronic device according to claim 1, wherein the first sub-pixel is a blue sub-pixel, a red sub-pixel or a green sub-pixel.

5. The electronic device according to claim 4, wherein the first sub-pixel is one of a blue sub-pixel, a red sub-pixel and a green sub-pixel, and the second sub-pixel is another one of the blue sub-pixel, the red sub-pixel and the green sub-pixel.

6. The electronic device according to claim 1, further comprising a plurality of touch units disposed in the working area and having a first touch unit, wherein the plurality of signal lines further comprise a touch signal line, the first touch unit is electrically connected to the touch signal line, and the first bio-sensor unit is electrically connected to the touch signal line.

7. The electronic device according to claim 6, wherein the touch signal line provides a constant voltage when the electronic device is in a bio-sensing state, and the touch signal line provides a waveform voltage when the electronic device is in a touch state.

8. The electronic device according to claim 6, wherein the touch signal line is at least partially overlapped with the first signal line in a top-view direction of the electronic device.

9. The electronic device according to claim 1, further comprising an insulating layer overlapped with the first bio-sensor unit, wherein the insulating layer has an arc-shaped profile.

10. The electronic device according to claim 9, wherein the insulating layer is disposed around the first bio-sensor unit and surrounds the first bio-sensor unit.

11. The electronic device according to claim 9, further comprising a light shielding cover disposed on the insulating layer and partially overlapped with the first bio-sensor unit.

12. The electronic device according to claim 11, further comprising a backlight unit, wherein the panel is disposed on the backlight unit.

13. The electronic device according to claim 12, further comprising a connection electrode electrically connected to the first bio-sensor unit and disposed between the first bio-sensor unit and the backlight unit, wherein the light shielding cover and the connection electrode have the same potential.

14. An electronic device, comprising:
a panel having a working area and a peripheral area;
a plurality of signal lines disposed on the panel and having a touch signal line;
a plurality of touch units disposed in the working area and having a first touch unit; and
a plurality of bio-sensor units disposed in the working area and having a first bio-sensor unit,
wherein the first touch unit is electrically connected to the touch signal line, and the first bio-sensor unit is electrically connected to the touch signal line.

15. The electronic device according to claim 14, wherein the touch signal line provides a constant voltage when the electronic device is in a bio-sensing state, and the touch signal line provides a waveform voltage when the electronic device is in a touch state.

16. The electronic device according to claim 14, further comprising an insulating layer overlapped with the first bio-sensor unit, wherein the insulating layer has an arc-shaped profile.

17. The electronic device according to claim 16, wherein the insulating layer is disposed around the first bio-sensor unit and surrounds the first bio-sensor unit.

18. The electronic device according to claim 16, further comprising a light shielding cover disposed on the insulating layer and partially overlapped with the first bio-sensor unit.

19. The electronic device according to claim 18, further comprising a backlight unit, wherein the panel is disposed on the backlight unit.

20. The electronic device according to claim 19, further comprising a connection electrode electrically connected to the first bio-sensor unit and disposed between the first bio-sensor unit and the backlight unit, wherein the light shielding cover and the connection electrode have the same potential.

* * * * *